Patented Apr. 11, 1939

2,153,729

UNITED STATES PATENT OFFICE 2,153,729

THIOBARBITURIC ACID DERIVATIVES

Ernest H. Volwiler, Highland Park, and Donalee L. Tabern, Lake Bluff, Ill., assignors to Abbott Laboratories, North Chicago, Ill., a corporation of Illinois No Drawing. Application April 16, 1934,
Serial No. 720,804

5 Claims. (Cl. 260—260)

Our invention relates to thio-barbituric acid derivatives, having the structure:

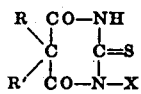

in which R and R' represent saturated or unsaturated alkyl or aryl groups, either the same or different, at least one of which contains more than three carbon atoms, and X represents hydrogen, an alkali or alkaline earth metal, or a primary or secondary alkyl amine. Said compounds are efficacious as hypnotics and sedatives.

These thio-barbituric acid derivatives are, in general, as effective in this regard as or more effective than the oxygen analogs, and in addition certain members show a definitely shorter period of hypnotic action. They are rapidly detoxified in the body, which is of clinical advantage, as, for example, when the compounds are used as surgical anesthetics or pre-anesthetics.

These thio-barbituric acid derivatives may be prepared by several methods, for example, by the condensation of a malonic ester with thio urea,

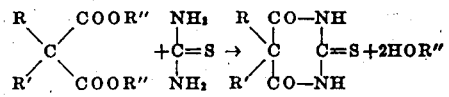

A satisfactory method of preparation consists in the condensation of one molecular equivalent of a mono- or di-substituted malonic ester with one or two molecular equivalents of thio-urea in the presence of two to four molecular equivalents of sodium ethylate. The solvent used for this reaction may be alcohol or a hydrocarbon solvent; a quantity of the solvent is preferably removed to enable a temperature of from 100° to 120° C. to be reached. The impure sodium salt thus formed is dissolved in cold water and precipitated by an acid. Purification may be accomplished by dissolving the barbituric acid derivative in alkali and reprecipitating by acid, followed by recrystallization from alcohol, dilute alcohol, benzene, or other suitable solvent; or by sublimation, or other suitable technique.

EXAMPLE 1

Ethyl (1-methyl butyl) thio-barbituric acid

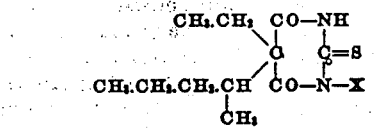

130 grams of ethyl (1-methyl butyl) malonic ester is added to a concentrated solution of sodium ethylate prepared from 34 grams of sodium in absolute alcohol; with stirring, 60 grams of finely divided thio-urea is added, and the mixture refluxed for 10 hours. Most or all of the solvent is evaporated and the residual mass is dissolved in cold water. The barbituric acid derivative so formed is precipitated by the addition of dilute hydrochloric acid. It may be purified by solution in dilute ammonium hydroxide solution and precipitated by carbon dioxide, followed by recrystallization from 95% alcohol. The ethyl (1-methyl butyl) thio-barbituric acid so obtained is a white crystalline solid, melting at 158–159° C. and readily forming salts with alkalies.

EXAMPLE 2

Allyl (2-methyl allyl) thio-barbituric acid

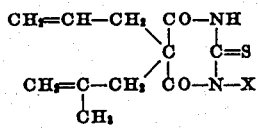

Following the same procedure as in Example 1, 50 grams of allyl (2-methyl allyl) malonic ester is condensed in absolute alcohol solution with 14 grams of sodium in the form of sodium ethylate and 25 grams of thio-urea. Upon completion of the reaction, the thio-barbituric acid derivative is precipitated directly from the cooled solution of the salt by carbon dioxide, and recrystallized. The crystals melt at 180–182° C.

EXAMPLE 3

Ethyl secondary-butyl thio-barbituric acid

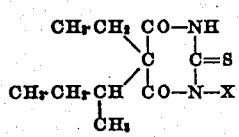

100 grams of ethyl secondary-butyl malonic ester is added to a solution of 24 grams of sodium in absolute alcohol followed by 44 grams of thio-urea. After refluxing for 24 hours, the solvent is removed, the resultant mass heated to 120°, and after cooling, the material is dissolved in water. By precipitating with acetic acid, the crystalline barbituric acid is obtained. It is dissolved in dilute alkali and reprecipitated by carbon dioxide. It melts at 163–165° C.

EXAMPLE 4

*Allyl secondary-butyl thio-barbituric acid*

$$\begin{array}{c} CH_2=CH-CH_2 \\ CH_3CH_2CH \\ | \\ CH_3 \end{array} \begin{array}{c} CO-NH \\ \diagdown / \\ C \\ / \diagdown \\ CO-N-X \end{array} \begin{array}{c} \\ C=S \\ \\ \end{array}$$

This compound is prepared in a manner similar to that given in Example 3, and when recrystallized from dilute alcohol, melts at 142–143° C.

EXAMPLE 5

*Ethyl (3-chloro-2-butenyl) thio-barbituric acid*

$$\begin{array}{c} CH_3CH_2 \\ CH_3-C=CH-CH_2 \\ | \\ Cl \end{array} \begin{array}{c} CO-NH \\ \diagdown / \\ C \\ / \diagdown \\ CO-N-X \end{array} \begin{array}{c} \\ C=S \\ \\ \end{array}$$

Eethyl (3-chloro 2-butenyl) malonic ester is prepared in the usual manner by condensing mono-ethyl malonic ester with 1,3-dichlorobuten-2; it boils at 175–80° at 32 mm. 60 grams of this ester and 22 grams of thio-urea is added to a solution of 14 grams of sodium in absolute alcohol. The product is isolated and purified as in Example 3. The crystals melt at 128–130°.

EXAMPLE 6

*Benzyl allyl thio-barbituric acid*

$$\begin{array}{c} C_6H_5CH_2 \\ CH_2=CH-CH_2 \end{array} \begin{array}{c} CO-NH \\ \diagdown / \\ C \\ / \diagdown \\ CO-N-X \end{array} \begin{array}{c} \\ C=S \\ \\ \end{array}$$

By condensing benzyl allyl malonic ester with thio-urea and sodium ethylate, as in previous examples, benzyl allyl thio-barbituric acid is obtained, melting at 149–150° C.

EXAMPLE 7

*Ethyl (2-ethyl-butyl) thio-barbituric acid*

$$\begin{array}{c} CH_3CH_2 \\ CH_3CH_2CH \cdot CH_2 \\ | \\ CH_2CH_3 \end{array} \begin{array}{c} CO-NH \\ \diagdown / \\ C \\ / \diagdown \\ CO-N-X \end{array} \begin{array}{c} \\ C=S \\ \\ \end{array}$$

110 grams of ethyl (2-ethyl-butyl) malonic ester is condensed with 44 grams of thio-urea in a solution of 28 grams of sodium in alcohol. The resultant thio-barbituric acid melts at 136–7° C.

Salts

The thio-barbituric acids are acid in character, forming salts with alkali and alkaline earth metals and with organic bases. These salts are stable in the solid state and reasonably so in solution.

The sodium salts may be prepared by dissolving one molecular equivalent of the thio-barbituric acid in warm absolute alcohol, which is added to a solution of one atomic equivalent of sodium ethylate in absolute alcohol. Upon evaporation of the alcohol, the sodium salt separates as a crystalline, slightly hygroscopic solid, readily soluble in water. The hydrogen ion concentrations of aqueous solutions of the salts are similar to those of the corresponding oxygen analogs.

The calcium salts may be produced by dissolving or suspending the thio-barbituric acid in water, alcohol, or dilute alcohol, adding an excess of lime, stirring, filtering, and concentrating the resultant solution. The calcium salts are readily soluble in water. A preferable method in the case of certain of the higher homologs where the calcium salts are less soluble, is the addition of a strong solution of calcium chloride or acetate to a solution of an alkaline earth or ammonium salt. The precipitated calcium salt may be readily filtered off and air-dried. Examples: The calcium salts of ethyl (2-ethyl-butyl) thio-barbituric acid and ethyl (1-methyl-butyl) thio-barbituric acids.

The mono alkyl and di-alkylamine salts may be prepared by dissolving the thio-barbituric acid in a slight excess of the amine, and removing the excess amine. These salts are readily soluble in water, but are easily hydrolyzed. The lower alkylamine salts in the solid state readily lose the amine, leaving behind the thio-barbituric acid.

The following thio-barbituric acids have been prepared:

| | M. P. |
|---|---|
| Ethyl (1-methyl-butyl) thio-barbituric acid | 158–9° |
| Ethyl (2-methyl-allyl) thio-barbituric acid | 160–61° |
| Allyl (2-methyl-allyl) thio-barbituric acid | 180–2° |
| Methyl (2-methyl-allyl) thio-barbituric acid | 128–31° |
| Ethyl secondary-butyl thio-barbituric acid | 163–5° |
| Allyl secondary-butyl thio-barbituric acid | 142–3° |
| Methyl (1-methyl-butyl) thio-barbituric acid | Wax-like |
| Ethyl (3-chloro-2-butenyl) thio-barbituric acid | 128–30° |
| Diallyl thio-barbituric acid | 134° |
| Ethyl isopropyl thio-barbituric acid | 192° |
| Benzyl allyl thio-barbituric acid | 140–50° |
| Ethyl n-butyl thio-barbituric acid | 144–5° |
| Ethyl isoamyl thio-barbituric acid | 175–7° |
| Phenyl ethyl thio-barbituric acid | 215–17° |
| Ethyl allyl thio-barbituric acid | 172–3° |
| Ethyl (2-ethyl-butyl) thio-barbituric acid | 137–138° |

We claim as our invention:

1. Anesthetic, sedative and sleep producing compounds having the formula:

$$\begin{array}{c} R \\ R' \end{array} \begin{array}{c} CO-NH \\ \diagdown / \\ C \\ / \diagdown \\ CO-N-X \end{array} \begin{array}{c} \\ C=S \\ \\ \end{array}$$

in which R and R' are members of the group consisting of saturated and unsaturated alkyl groups one of which contains more than three carbon atoms, and X is selected from the group consisting of hydrogen, alkali and alkaline earth metals and primary and secondary alkyl amines.

2. Anesthetic, sedative and sleep producing compounds having the formula:

$$\begin{array}{c} C_2H_5 \\ R' \end{array} \begin{array}{c} CO-NH \\ \diagdown / \\ C \\ / \diagdown \\ CO-N-X \end{array} \begin{array}{c} \\ C=S \\ \\ \end{array}$$

in which R' is a member of the group consisting of saturated and unsaturated alkyl groups containing more than 3 carbon atoms, and X is selected from the group consisting of hydrogen, alkali and alkaline earth metals and primary and secondary alkyl amines.

3. Anesthetic, sedative and sleep producing compounds having the following formula:

$$\begin{array}{c} R \\ R' \end{array} \begin{array}{c} CO-NH \\ \diagdown / \\ C \\ / \diagdown \\ CO-N-X \end{array} \begin{array}{c} \\ C=S \\ \\ \end{array}$$

wherein R is a member of the group consisting of saturated and unsaturated alkyl groups and R' is a member of the group consisting of saturated and unsaturated secondary alkyl groups containing more than 3 carbon atoms, and X is selected from the group consisting of hydrogen, alkali and alkaline earth metals and primary and secondary alkyl amines.

4. Anesthetic, sedative and sleep producing compounds having the following formula:

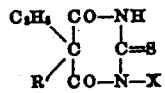

in which R' is a member of the group consisting of saturated and unsaturated secondary alkyl groups containing more than 3 carbon atoms, and X is selected from the group consisting of hydrogen, alkali and alkaline earth metals and primary and secondary alkyl amines.

5. Anesthetic, sedative and sleep producing compounds having the formula:

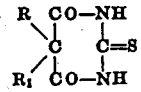

in which R and $R_1$ are members of the group consisting of saturated and unsaturated alkyl radicals, R having at least three carbon atoms and $R_1$ at least four carbon atoms, and their salts.

ERNEST H. VOLWILER.
DONALEE L. TABERN.